United States Patent [19]
Babu et al.

[11] Patent Number: 5,766,339
[45] Date of Patent: Jun. 16, 1998

[54] PROCESS FOR PRODUCING CEMENT FROM A FLUE GAS DESULFURIZATION PROCESS WASTE PRODUCT

[75] Inventors: Manyam Babu, Upper St. Clair; John W. College, Pittsburgh; Russell C. Forsythe, Ellwood City, all of Pa.

[73] Assignee: Dravo Lime Company, Pittsburgh, Pa.

[21] Appl. No.: 852,798

[22] Filed: May 7, 1997

[51] Int. Cl.⁶ ............................. C04B 7/36; C04B 7/43; C01B 17/69
[52] U.S. Cl. ............... 106/745; 106/752; 106/757; 106/761; 106/763; 106/765; 106/769; 423/522; 423/530; 423/541.1
[58] Field of Search ................ 106/745, 752, 106/757, 761, 763, 765, 769; 423/522, 530, 541.1

[56] References Cited

U.S. PATENT DOCUMENTS

| | | | |
|---|---|---|---|
| 3,607,045 | 9/1971 | Wheelock et al. | 423/402 |
| 3,717,489 | 2/1973 | Herzog et al. | 106/752 |
| 4,028,126 | 6/1977 | Mori et al. | 106/749 |
| 4,040,853 | 8/1977 | Binder et al. | 106/757 |
| 4,065,320 | 12/1977 | Heian et al. | 106/752 |
| 4,102,989 | 7/1978 | Wheelock | 423/541.1 |
| 4,120,645 | 10/1978 | Heian et al. | 106/752 |
| 4,432,954 | 2/1984 | Quante | 106/752 |
| 4,487,784 | 12/1984 | Kuroda et al. | 106/752 |
| 4,662,945 | 5/1987 | Lawall | 106/752 |
| 5,512,097 | 4/1996 | Emmer | 106/745 |
| 5,626,667 | 5/1997 | Bohle | 106/745 |

FOREIGN PATENT DOCUMENTS

| | | | |
|---|---|---|---|
| 2759249 | 7/1979 | Germany | 106/752 |
| 59-045948 | 3/1984 | Japan | 106/745 |
| 1112180 | 5/1968 | United Kingdom | 106/745 |

OTHER PUBLICATIONS

"Gypsum Finds New Role In Easing Sulfur Shortage", Process Flowsheet, Nov. 4, 1968/Chemical Engineering.

"Sulphuric Acid and Cement From By–Product Gypsum" CHEMICO Offer Process Developed by OKC Corp., Sulfur No. 79, Nov./Dec. 1968.

"Production of Sulphuric Acid or Sulphur From Calcium Sulphate" Dorr–Oliver's Investigations of FluoSolids Roaster System Applications, Sulphur No. 80, Jan./Feb. 1969.

"Sulphuric Acid and Cement From Phosphoric Acid by–product Phospho–Gypsum" Sulphur No. 74, Jan./Feb. 1968.

"The Manufacture of Cement and Sulphuric Acid From Calcium Sulphste", United Nations Industiral Development Organization Vienna, United Nations Publication, New York, 1971 [no month].

Primary Examiner—Anthony Green
Attorney, Agent, or Firm—Armstrong, Westerman Hattori, McLeland & Naughton

[57] ABSTRACT

Cement is produced by forming a moist mixture of a flue gas desulfurization process waste product containing 80–95 percent by weight calcium sulfite hemihydrate and 5–20 percent by weight calcium sulfate hemihydrate, aluminum, iron, silica and carbon, agglomerating the moist mixture while drying the same to form a feedstock, and calcining the dry agglomerated feedstock in a rotary kiln. Sulfur dioxide released from the calcium sulfite hemihydrate and calcium sulfate hemihydrate during calcination may be used to produce sulfuric acid, while heat recovered in the process is used to dry the agglomerating feedstock.

16 Claims, 1 Drawing Sheet

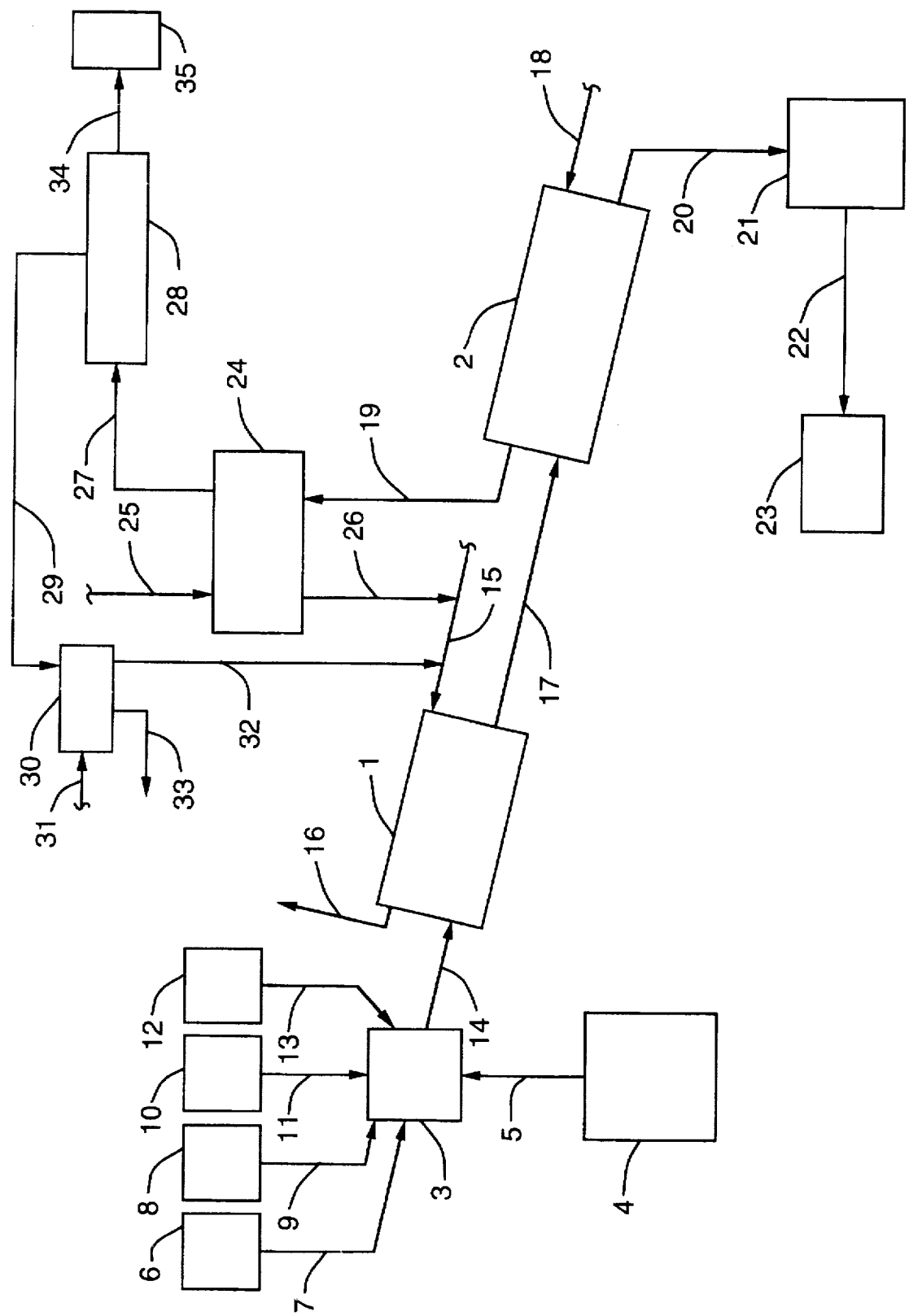

PROCESS FOR PRODUCING CEMENT FROM A FLUE GAS DESULFURIZATION PROCESS WASTE PRODUCT

FIELD OF THE INVENTION

The present invention is to a process for the production of cement, and more specifically to a process for producing cement from a flue gas desulfurization process waste product.

BACKGROUND OF THE INVENTION

Conventional cement manufacturing plants are usually adapted to form a cement clinker in a rotary kiln, with the cement clinker ground to a powdery substance as a cement product. The raw materials fed to the rotary kiln are a source of calcium, such as calcium oxide or carbonate, a siliceous compound, such as sand, and a source of aluminum and iron. Limestone, clay, shale or sand and iron ore may be used as raw materials. These raw materials are calcined in the rotary kiln, cooled and crushed to form cement.

In place of limestone or lime, as calcium sources fed to a cement process, processes have been developed where gypsum ($CaSO_4.2H_2O$), or calcium sulfate ($CaSO_4$) have been used as a calcium source. In such processes, however, carbon such as coke, must also be added to the raw material charge to the calcination apparatus such that CaS is formed by the reaction of calcium sulfate and carbon:

$$CaSO_4 + 2C \rightarrow CaS + 2CO_2 \qquad (1)$$

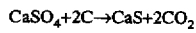

with the CaS reacting with further $CaSO_4$ to form calcium oxide (CaO):

$$CaS + 3CaSO_4 \rightarrow 4CaSO_3 \rightarrow 4CaO + 4SO_2 \qquad (2)$$

In such calcium sulfate to cement processes, gypsum, upon decomposition acts as a calcium source for the cement production while the $SO_2$ produced is used to produce sulfuric acid. With gypsum ($CaSO_4.2H_2O$), the same is dehydrated to $CaSO_4$ and the anhydrate blended with carbon and sand or shale, with the blended mixture fed to a kiln. The kiln is operated under slightly reducing conditions to ensure $CaSO_4$ decomposition. Since $CaSO_4$ is very difficult to decompose when heating, temperatures in excess of about 2600° F. (1425° C.) are normally required. With the presence of carbon, however, such decomposition temperatures are in the range of about 1800°–2100° F. (982°–1149° C). In such a process, such as the known Muellar Kuenn process, the amount of carbon added must be carefully controlled since too much carbon will result in an excess of CaS and production of a poor cement clinker, while insufficient carbon results in contaminant $CaSO_4$ in the clinker and also results in a poor quality cement clinker. Any sulfur that remains will reduce the melting point of the cement clinker product and adversely effect the fusion of the calcium and silicon materials. Fusion is very important in cement clinker manufacture as it ultimately determines the strength characteristics of the cement. The fusion occurs at the burner side of the rotary kiln, opposite the raw material charge side of the kiln, with hot combustion gases passing countercurrent to the flow of the raw materials through the rotary kiln.

It has also been proposed to use gypsum that is a product of a flue gas desulfurization process using limestone as a sulfur dioxide absorption medium as, for example, described in U.S. Pat. No. 5,512,097. In that process, a reverse jet scrubber using finely divided limestone is provided and the calcium sulfate slurry formed by reaction of sulfur dioxide with calcium carbonate in the absorption medium is returned to a limestone comminution step of the cement making process.

SUMMARY OF THE INVENTION

A process for producing cement from a flue gas desulfurization waste product is carried out by providing a moist flue gas desulfurization waste product containing 80–95 percent by weight solids of calcium sulfite hemihydrate and 5–20 percent by weight solids of calcium sulfate hemihydrate and adding thereto a source of aluminum and iron, such as fly ash, carbon, such as coke, and a siliceous material, such as sand, to form a moist mixture. The moist mixture is agglomerated, such as by pelletizing, while removing water therefrom to provide a dry agglomerated feedstock. The dry agglomerated feedstock is charged to a rotary kiln and calcined to produce a cement clinker which is cooled and pulverized to produce a cement. Sulfur dioxide that is released by calcination of the feedstock may be used to produce sulfuric acid.

BRIEF DESCRIPTION OF THE DRAWING

The invention will become more readily apparent from the following description of a preferred embodiment thereof shown, by way of example, in the accompanying drawing which is a schematic illustration of an embodiment of the process of the present invention.

DETAILED DESCRIPTION

The present process provides for the production of a salable cement product, and optimally also the production of sulfuric acid, from a flue gas desulfurization process waste product which would normally be discarded as a landfill material.

The flue gas desulfurization process waste product used in the present manufacturing process is one which contains about 80–95 percent by weight of solids of calcium sulfite hemihydrate and 5–20 percent by weight of solids of calcium sulfate hemihydrate. Such a flue gas desulfurization process waste product can result from a wet scrubbing process for removing sulfur dioxide from a hot gaseous stream, such as a coal combustion flue gas, by contact of the gaseous stream with limestone, lime, or, preferably with a magnesium ion-containing aqueous lime slurry. In such magnesium-ion containing lime slurry wet scrubbing processes, as for example described in U.S. Pat. No. 3,919,393; U.S. Pat. No. 3,919,394; U.S. Pat. No. 4,164,549; the contents of which are incorporated by reference herein, an aqueous scrubbing slurry is formed from calcium hydroxide and magnesium hydroxide, where the magnesium hydroxide is present in an amount to provide an effective magnesium ion content in a wet scrubbing unit of between about 2500 and 9000 parts per million, and contacted with the sulfur dioxide-containing gas stream. Spent aqueous scrubbing medium is discharged from the wet scrubbing unit and passed to a thickener where a thickened waste sludge, as a flue gas desulfurization process waste product, is separated from the scrubbing liquor. The thickened sludge contains generally between about 20–30 weight percent solids and can be further dewatered, such as by centrifuging or filtering to provide a solids content in the flue gas desulfurization process of about 45–85 percent by weight solids. The solids content of the flue gas desulfurization process waste product, as above described, contains about 80–95 percent by weight calcium sulfite hemihydrate and 5–20 percent by weight calcium sulfate hemihydrate. With use of the hemihydrates of calcium sulfite and calcium sulfate, no precalcination step is required to drive off two water molecules as is required with gypsum ($CaSO_4 \cdot 2H_2O$).

In the present process, the flue gas desulfurization process waste product has added thereto a source of aluminum, a source of iron, a source of carbon, and a silica source such as a siliceous material to form a moist mixture. The source of aluminum may be clay or other aluminum-containing material, while the source of iron may be iron ore or other source of iron. An especially useful source of aluminum, iron and silica is fly ash which contains $Fe_2O_3$, $Al_2O_3$ and $SiO_2$. The source of carbon may be coke, while the siliceous material may be sand or shale. These particular additive materials are well known in the art of cement manufacture, as are other known materials which provide the aluminum, iron, carbon and silica in the desired proportions for manufacture of cement.

The moist mixture of the flue gas desulfurization process waste product, aluminum source, iron source, carbon source and silica source is then agglomerated to form an agglomerated feedstock for charging to a cement kiln. The water content of the moist mixture should be between about 5–20 percent by weight and, during agglomeration, the material should be dried so as to provide an agglomerated feedstock containing about 6 percent or less water, preferably by contact of the moist mixture with hot air during the agglomeration step. Conventional agglomerating apparatus such as extruders, rotary agglomerators, pug mills, or pelletizers may be used to form a dry (less than 6 percent or less water by weight) agglomerated kiln feedstock, while the drier may also be a rotary or other post agglomerating drier apparatus.

The dry agglomerated feedstock is then calcined to produce a cement clinker. Such calcination is effected in a conventional cement rotary kiln where the feedstock is charged at one end, the entry end, and passes countercurrent, in the rotary kiln, to a flow of hot combustion gases that are charged at other end, the exit end, of the kiln. During calcination, sulfur dioxide is released from the feedstock, adjacent the entry end of the rotary kiln, which sulfur dioxide is carried with the hot combustion gases and discharged from the rotary kiln. When the $CaSO_3 \cdot \frac{1}{2}H_2O$ and minor amount of $CaSO_4 \cdot \frac{1}{2}H_2O$ have been calcined to produce CaO in the rotary kiln, the CaO so produced by reaction with carbon then reacts with the silicon source, iron source and aluminum source in the dry agglomerated feedstock to form a cement clinker. Complete sulfur release is necessary because even a small amount of sulfur in the cement clinker will reduce the melting point of the product and adversely affect the fusion of the calcium and silicon components, which fusion determines the strength characteristics of the resultant cement product. Fusion is effected at a burner side or exit end of the rotary kiln and the cement clinker produced is discharged from the exit end, cooled, pulverized, and collected as a cement product.

In a preferred embodiment of the present process, the sulfur dioxide-containing hot combustion gases discharged from the rotary kiln are used to heat air for drying additional moist mixture fed to the agglomerating apparatus and also to produce sulfuric acid. Because gases discharged from the agglomerating apparatus are laden with sulfur dioxide and cannot be humidified, the gases are passed to an indirect heat exchanger wherein the temperature of the hot discharged gases is lowered while a flow of air is heated to an elevated temperature. This heated air is then charged to the agglomerating drying apparatus and used to dry the moist mixture passing therethrough.

The sulfur dioxide-containing gases discharged from the rotary kiln, after passage through a heat exchanger, are used to produce sulfuric acid by a conventional sulfuric acid production system. In such systems, sulfur dioxide is oxidized to sulfur trioxide, with the release of heat, and the sulfur trioxide, so produced, is converted to sulfuric acid with the release of additional heat, both steps being exothermic reactions. The heat so produced during production of sulfuric acid from the discharged sulfur dioxide is then used to preheat air that is also fed to the agglomerating apparatus to dry additional moist mixture and produce a dry agglomerated feedstock for calcination in the rotary kiln.

The operating parameters of the rotary kiln, wherein the dry agglomerated feedstock is calcined to a cement clinker, such as off gas oxygen concentration, hot zone temperature, and/or material residence time is readily determined.

A cement clinker produced with a low freelime level (1.12%) and a low total sulfur level (0.04%) $SO_3 \rightarrow 99.95\%$ volatilization was produced using a single stage rotary kiln processing a mix containing a flue gas desulfurization process waste product containing 90% $CaSO_3 \cdot \frac{1}{2}H_2O$ and 10% $CaSO_4 \cdot \frac{1}{2}H_2O$. A test rotary kiln (1 foot inside diameter ×15 feet length) operation with a residence time of 1.2 hr. (or less), 1500° C. hot zone temperature and <1.5% off gas oxygen concentration should be sufficient to produce a cement clinker product with a low freelime level (<1.5%) and high sulfur volatilization (>99%). An especially useful moist mixture to produce a cement clinker with a $C_3S$ level of 59% was found to be 82.77 flue gas desulfurization process waste product (90% $CaSO_3 \cdot \frac{1}{2}H_2O$ and 10% $CaSO_4 \cdot \frac{1}{2}H_2O$); 5.80% fly ash; 6.43% silica sand and 5.00% coke (dry basis) using the above process parameters.

Referring now to the drawing, which schematically illustrates an embodiment of the present process, an agglomerating apparatus 1 is provided in association with a rotary kiln 2. To a mixing device 3, there are fed a moist flue gas desulfurization process waste product containing 80–95 percent by weight of solids of calcium sulfite hemihydrate and 5–20 percent by weight of solids of calcium sulfate hemihydrate from a source 4 through line 5, an aluminum source from a supply 6 through line 7, an iron source from a supply 8 through line 9, a carbon source from a supply 10 through line 11, and a silica source in the form of a siliceous material from a supply 12 through line 13. Fly ash, which is principally $SiO_2$, $Fe_2O_3$ and $Al_2O_3$ is preferred as the source of silica, iron and aluminum. A moist mixture, preferably containing about 5 to 20 weight percent water, of the flue gas desulfurization process waste product, aluminum, iron, carbon and silica is formed in the mixing device 3 which is fed through line 14 to the agglomerating apparatus 1. Also fed to the agglomerating apparatus 1 is a supply of hot air through line 15, which hot air is supplied at a temperature and flow rate sufficient to dry the moist mixture to form an agglomerated kiln feedstock containing about 6 percent or less water, with the moisture laden air produced discharged through line 16. The agglomerated feedstock, containing about 6 percent or less water, is discharged from the agglomerating apparatus and fed through line 17 to the rotary kiln 2. The rotary kiln 2 is heated, as is conventional by a burner (not shown) fed with fuel through line 18. Off gases from the rotary kiln 2 are discharged through line 19, while the calcined dry agglomerate feed, a cement clinker produced in the rotary kiln, is discharged through line 20 and fed to a pulverizer 21 wherein the cement clinker is ground to a suitable particle size and fed through line 22 to a cement collection device 23.

The dry agglomerated kiln feedstock, upon entry to the rotary kiln 2, is heated by the hot combustion gases from the kiln burner and sulfur dioxide is released from the feedstock material at the entry end of the rotary kiln. Sulfur dioxide is released during calcination of the calcium sulfite hemihydrate and calcium sulfate hemihydrate and substantially all of the sulfur content of the hemihydrates must be released in early stages of calcination or the solids may melt prematurely and fuse into a poor clinker material product. The sulfur dioxide released from the dry agglomerated kiln feedstock is carried, along with the combustion gases, through line 19 to an indirect heat exchanger 24 where the same is used to heat air from line 25, with the heated air passed through line 26 for use as hot air in line 15 fed to the agglomerating apparatus 1. The hot combustion gases containing sulfur dioxide, after passage through the indirect heat exchanger 24 are fed through line 27 to a sulfuric acid producing plant 28. As is known, in a plant for producing sulfuric acid from sulfur dioxide, heat is produced upon oxidation of the sulfur dioxide to sulfur trioxide and also heat is produced upon conversion of the sulfur trioxide to sulfuric acid. Such heat produced in the present process, in off gases from the sulfuric acid plant 28 fed through line 29 to a heat exchanger 30 is used to heat air from line 31. The heated air is fed through line 32 to line 15 for use in drying the moist mixture in agglomerating apparatus 1 while the off gases from the sulfuric acid plant are discharged from the heat exchanger 30 through line 33. The sulfuric acid produced in plant 28 is discharged through line 34 and collected at 35.

What is claimed is:

1. A process for producing cement from a flue gas desulfurization process waste product, comprising:
   providing a moist flue gas desulfurization process waste product containing 80–95 percent by weight of solids of calcium sulfite hemihydrate and 5–20 percent by weight of solids of calcium sulfate hemihydrate;
   adding a source of aluminum, iron, carbon, and a siliceous material to said flue gas desulfurization process waste product to form a moist mixture thereof;
   agglomerating said moist mixture while removing water therefrom, by contact with hot air, to provide a dry agglomerated kiln feedstock containing about 6 percent or less water;
   calcining said dry agglomerated kiln feedstock in a rotary kiln to produce a cement clinker; and
   pulverizing said cement clinker to produce cement.

2. The process for producing cement from a flue gas desulfurization process waste product as defined in claim 1 wherein said source of aluminum and iron comprises fly ash.

3. The process for producing cement from a flue gas desulfurization process waste product as defined in claim 1 wherein said waste product results from a flue gas desulfurization process using a magnesium-enhanced lime slurry for reaction with sulfur dioxide in a gas stream.

4. The process for producing cement from a flue gas desulfurization process waste product as defined in claim 1 wherein said waste product results from a flue gas desulfurization process using lime for reaction with sulfur dioxide in a gas stream.

5. The process for producing cement from a flue gas desulfurization process waste product as defined in claim 1 wherein said waste product results from a flue gas desulfurization process using limestone for reaction with sulfur dioxide in a gas stream.

6. The process for producing cement from a flue gas desulfurization process waste product as defined in claim 1 wherein said moist mixture contains between about 5 to 20 weight percent of water.

7. The process for producing cement from a flue gas desulfurization process waste product as defined in claim 1 wherein said dry agglomerated kiln feedstock has a solid content comprising, by weight, 82.77 percent flue gas desulfurization process waste product, 5.80 percent fly ash, 6.43 percent sand, and 5.0 percent coke.

8. The process for producing cement from a flue gas desulfurization process waste product as defined in claim 1 wherein sulfur dioxide is produced from calcining of said agglomerated kiln feedstock in said rotary kiln and said sulfur dioxide is discharged from said rotary kiln to an indirect heat exchanger to heat air and air heated in said heat exchanger is used to remove water from said moist mixture during agglomeration.

9. The process for producing cement from a flue gas desulfurization process waste product as defined in claim 8 wherein said sulfur dioxide, after heating air in said heat exchanger is passed to a sulfuric acid producing plant and used for production of sulfuric acid.

10. The process for producing cement from a flue gas desulfurization process waste product as defined in claim 9 wherein hot gases produced in said sulfuric acid producing plant are used to preheat air and said preheated air is used to remove water from said moist mixture during agglomeration.

11. A process for producing cement from a flue gas desulfurization process waste product, comprising:
    providing a moist flue gas desulfurization process waste product containing 80–95 percent by weight of solids of calcium sulfite hemihydrate and 5–20 percent by weight of solids of calcium sulfate hemihydrate;
    adding a source of aluminum, iron, carbon, and a siliceous material to said flue gas desulfurization process waste product to form a moist mixture thereof;
    agglomerating said moist mixture while removing water therefrom, by contact with hot air, to provide a dry agglomerated kiln feedstock containing about 6 percent or less water;
    calcining said dry agglomerated kiln feedstock in a rotary kiln to produce a cement clinker and sulfur dioxide;
    removing said cement clinker from the rotary kiln and pulverizing the same to produce cement;
    discharging said sulfur dioxide from the rotary kiln;
    passing said discharged sulfur dioxide to an indirect heat exchanger to heat air; and
    using the heated air so produced to remove water from said moist mixture during said agglomerating.

12. The process for producing cement from a flue gas desulfurization process waste product as defined in claim 11 wherein said sulfur dioxide, after heating air in said heat exchanger is passed to a sulfuric acid producing plant and used for production of sulfuric acid.

13. The process for producing cement from a flue gas desulfurization process waste product as defined in claim 12 wherein hot gases produced in said sulfuric acid producing plant are used to preheat air and said preheated air is used to remove water from said moist mixture during agglomeration.

14. The process for producing cement from a flue gas desulfurization process waste product as defined in claim 11 wherein said source of siliceous material, aluminum and iron comprises fly ash.

15. The process for producing cement from a flue gas desulfurization process waste product as defined in claim 11 wherein said dry agglomerated kiln feedstock has a solid content comprising, by weight 82.77 percent flue gas desulfurization process waste product, 5.80 percent fly ash, 6.43 percent sand, and 5.0 percent coke.

16. A process for producing cement from a flue gas desulfurization process waste product, comprising:

providing a moist flue gas desulfurization process waste product containing 80–95 percent by weight of solids of calcium sulfite hemihydrate and 5–20 percent by weight of solids of calcium sulfate hemihydrate resulting from a flue gas desulfurization process using a magnesium-enhanced lime slurry for reaction with sulfur dioxide in a gas stream;

adding fly ash containing aluminum and iron, carbon, and sand to said flue gas desulfurization process waste product to form a moist mixture thereof;

agglomerating said moist mixture while removing water therefrom, by contact with hot air, to provide a dry agglomerated kiln feedstock containing about 6 percent or less water;

calcining said dry agglomerated kiln feedstock in a rotary kiln to produce a cement clinker and sulfur dioxide;

discharging said sulfur dioxide from the rotary kiln to an indirect heat exchanger and heating air in said heat exchanger therewith;

using said heated air to remove water from said moist mixture during agglomeration; and pulverizing said cement clinker to produce cement.

* * * * *